United States Patent
Gelardi

[11] Patent Number: 6,093,140
[45] Date of Patent: Jul. 25, 2000

[54] MEDIA STORING TRAY-BOARD MECHANICAL ATTACHMENT

[75] Inventor: John A. Gelardi, Kennebunkport, Me.

[73] Assignee: Sagoma Plastics, Biddeford, Me.

[21] Appl. No.: 09/197,670

[22] Filed: Nov. 23, 1998

[51] Int. Cl.[7] .................................................. B31B 13/00
[52] U.S. Cl. ........................ 493/374; 493/379; 206/308.1
[58] Field of Search ..................... 493/374, 379; 206/307, 308.1, 310, 311, 312

[56] References Cited

U.S. PATENT DOCUMENTS

| | | |
|---|---|---|
| 3,825,112 | 7/1974 | Schumaker et al. . |
| 4,263,688 | 4/1981 | Freeman et al. ........................ 493/379 |
| 4,407,410 | 10/1983 | Graetz et al. . |
| 4,488,645 | 12/1984 | Yamaguchi . |
| 4,519,500 | 5/1985 | Perchak . |
| 4,535,888 | 8/1985 | Nusselder . |
| 4,627,531 | 12/1986 | Clemens . |
| 4,635,792 | 1/1987 | Yamada et al. . |
| 4,702,369 | 10/1987 | Philosophe . |
| 4,709,812 | 12/1987 | Kosterka . |
| 4,709,813 | 12/1987 | Wildt . |
| 4,746,013 | 5/1988 | Suzuki et al. . |
| 4,750,618 | 6/1988 | Schubert . |
| 4,760,914 | 8/1988 | Gelardi et al. . |
| 4,793,479 | 12/1988 | Otsuka et al. . |
| 4,805,769 | 2/1989 | Soltis et al. . |
| 4,805,770 | 2/1989 | Grobecker et al. . |
| 4,867,302 | 9/1989 | Takahashi . |
| 4,874,085 | 10/1989 | Grobecker et al. . |
| 4,903,829 | 2/1990 | Clemens . |
| 4,993,552 | 2/1991 | Bugbey et al. . |
| 5,088,599 | 2/1992 | Mahler . |
| 5,101,971 | 4/1992 | Grobecker . |
| 5,135,106 | 8/1992 | Morrone . |
| 5,188,230 | 2/1993 | O'Brien et al. . |
| 5,205,405 | 4/1993 | O'Brien et al. . |
| 5,219,417 | 6/1993 | O'Brien et al. . |
| 5,248,032 | 9/1993 | Sheu et al. . |
| 5,267,647 | 12/1993 | Stumpff et al. . |
| 5,269,409 | 12/1993 | Brandt et al. . |
| 5,284,242 | 2/1994 | Roth et al. . |
| 5,284,248 | 2/1994 | Dunker . |
| 5,299,186 | 3/1994 | Tsurushima . |
| 5,322,162 | 6/1994 | Melk . |
| 5,332,089 | 7/1994 | Tillett et al. . |
| 5,333,728 | 8/1994 | O'Brien et al. . |
| 5,366,073 | 11/1994 | Turrentine et al. . |
| 5,366,074 | 11/1994 | O'Brien et al. . |
| 5,372,253 | 12/1994 | O'Brien et al. . |
| 5,379,890 | 1/1995 | Mahler . |
| 5,400,902 | 3/1995 | Kaminski . |
| 5,402,882 | 4/1995 | Bandy et al. . |
| 5,417,324 | 5/1995 | Joyce et al. . |
| 5,425,448 | 6/1995 | O'Brien et al. . |
| 5,450,951 | 9/1995 | Luckow . |
| 5,450,953 | 9/1995 | Reisman . |
| 5,477,960 | 12/1995 | Chen . |
| 5,501,327 | 3/1996 | Cox . |
| 5,515,968 | 5/1996 | Taniyama . |
| 5,522,501 | 6/1996 | Luckow . |
| 5,600,628 | 2/1997 | Spector . |
| 5,630,504 | 5/1997 | Fitzsimmons et al. . |
| 5,884,761 | 3/1999 | Gelardi et al. ........................ 206/308.1 |

FOREIGN PATENT DOCUMENTS

| | | |
|---|---|---|
| 0 420 350 | 4/1991 | European Pat. Off. . |
| 39 27 380 | 2/1991 | Germany . |
| 41 28 925 | 12/1992 | Germany . |
| 2 266 514 | 11/1993 | United Kingdom . |

*Primary Examiner*—Eugene Kim
*Attorney, Agent, or Firm*—James Creighton Wray; Meera P. Narasimhan

[57] ABSTRACT

A media holding package assembly apparatus forms a trough with a folded and creased board for fitting within side walls of a media-holding tray and mechanically locking with the media holding tray. Hold-downs are extensibly positioned at each end of the board for extending over the board. Multiple fingers are positioned beneath the board in rows along each side of the board for extending upward after the hold-downs have been extended over the board to form a trough from the board for inserting within rigid side walls of a tray.

3 Claims, 6 Drawing Sheets

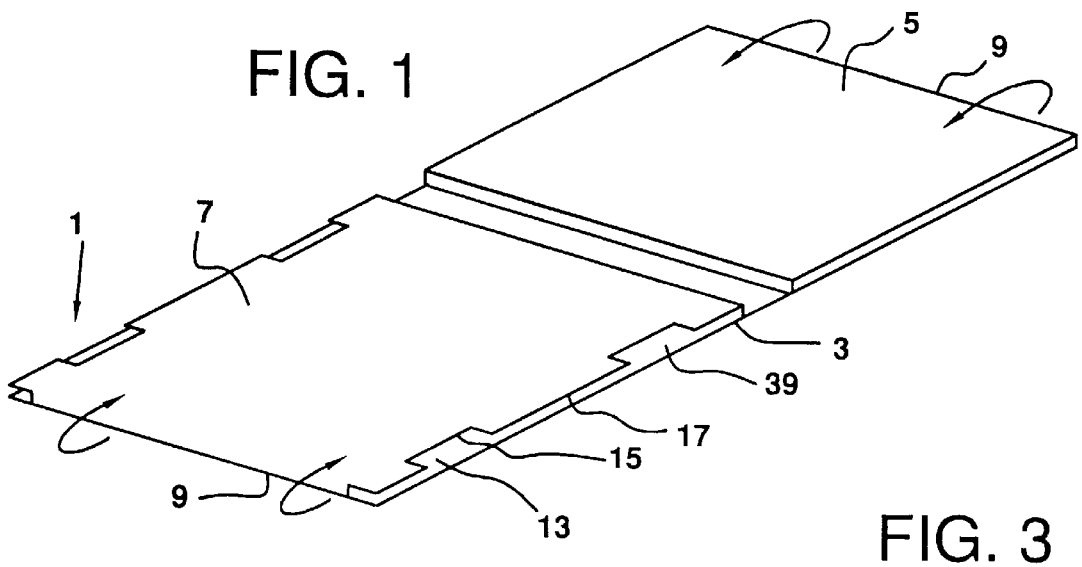
FIG. 1
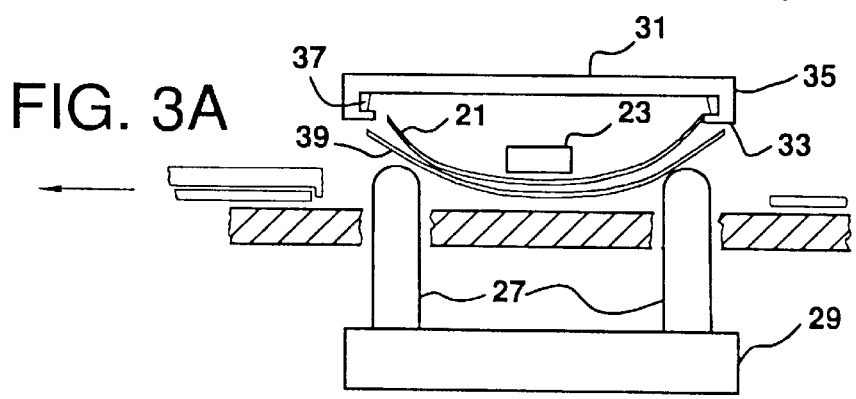
FIG. 3
FIG. 3A
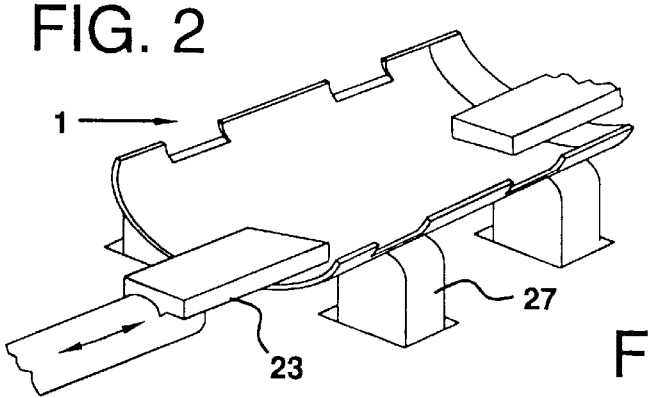
FIG. 2
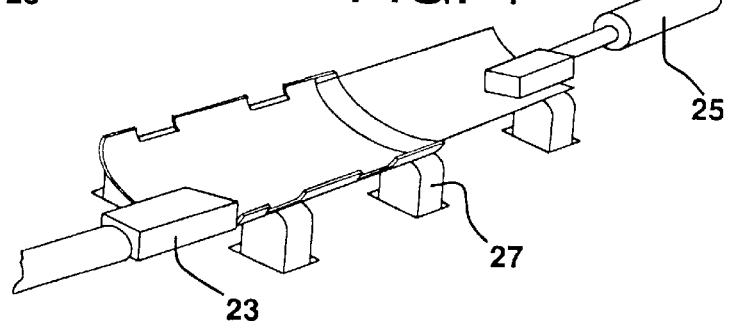
FIG. 4

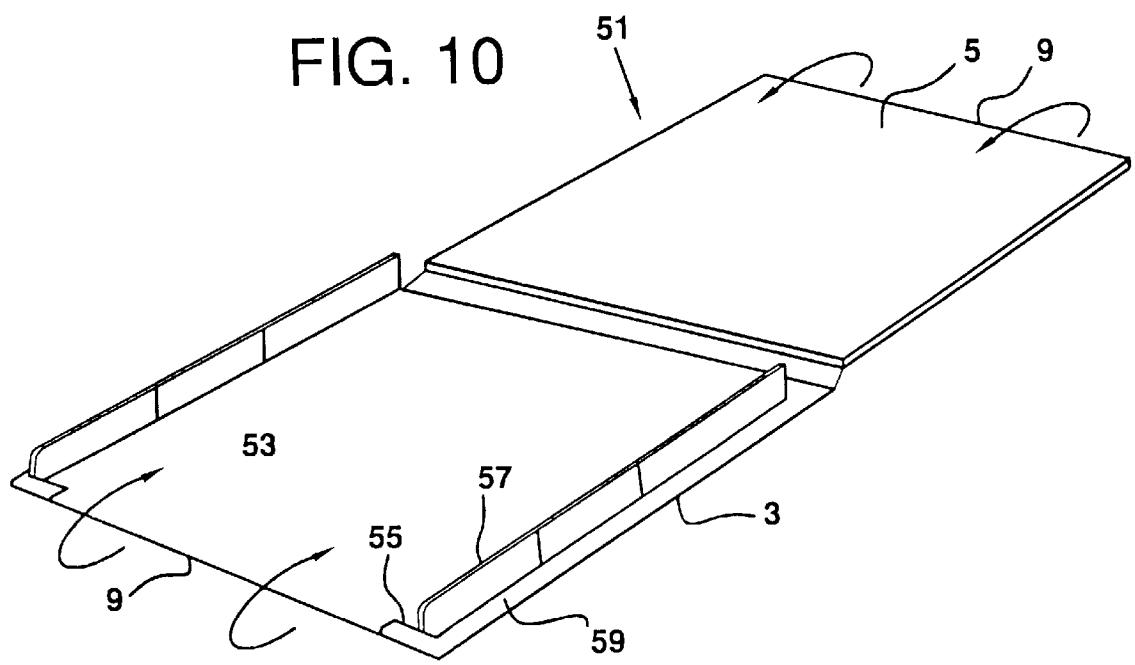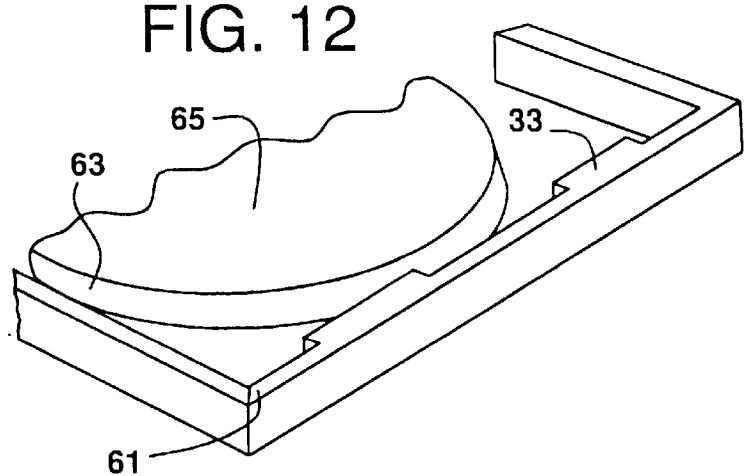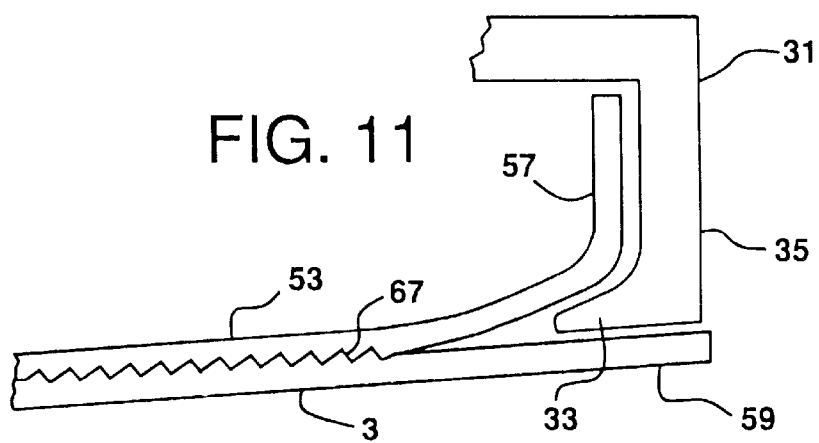

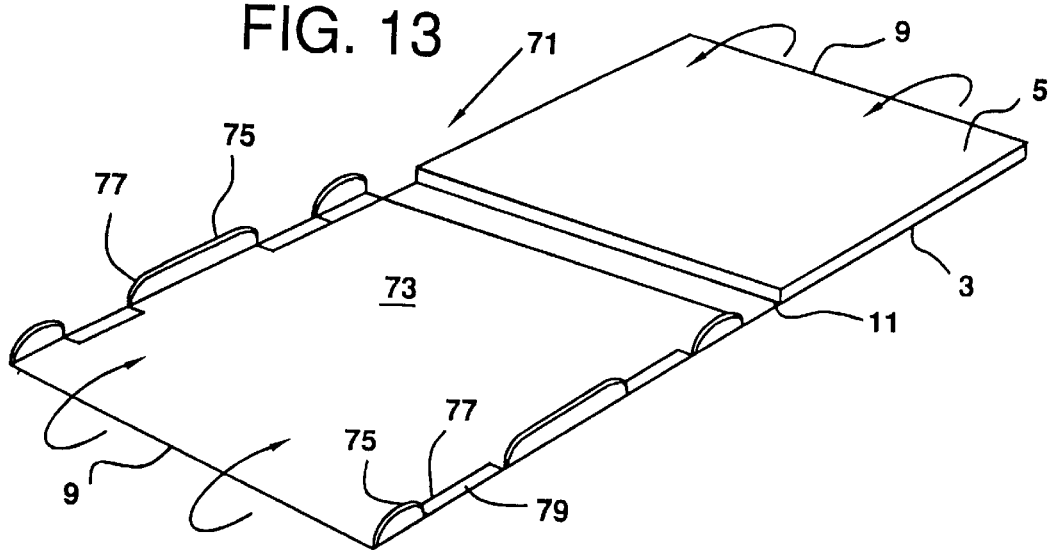
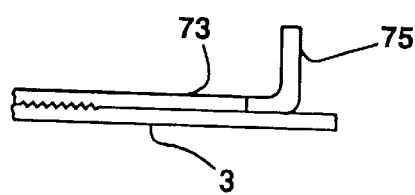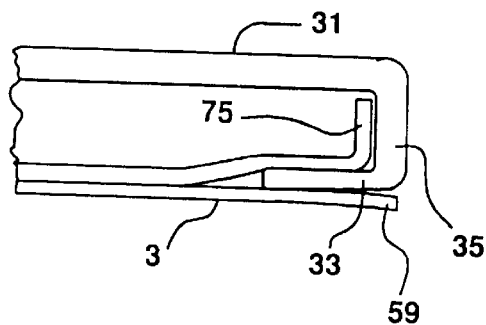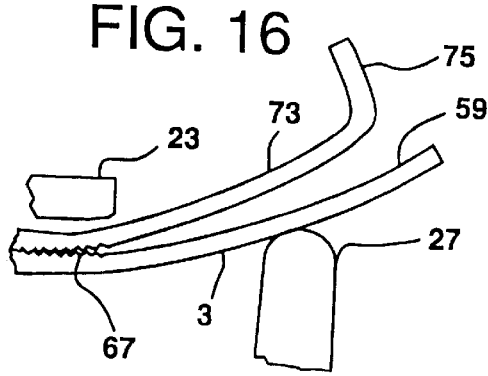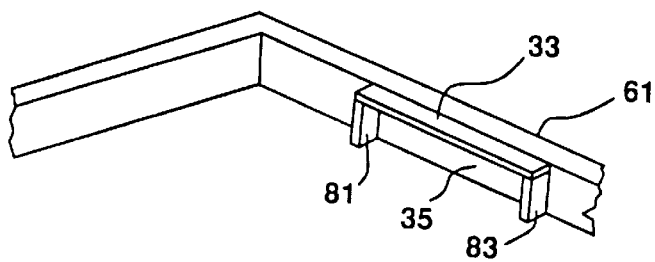

MEDIA STORING TRAY-BOARD MECHANICAL ATTACHMENT

SUMMARY OF THE INVENTION

A media holding package assembly apparatus forms a trough with a folded and creased board for fitting within side walls of a media-holding tray and mechanically locking with the media holding tray. Hold-downs are extensibly positioned at each end of the board for extending over the board. Multiple fingers positioned beneath the board in rows along each side of the board extend upward after the hold-downs have been extended over the board, to form a trough from the board for inserting within rigid side walls of a tray.

A new package for holding a flat recorded media has a tray having a bottom and an upper surface and a central recess in the upper surface for holding the flat recorded media. First and second end walls and first and second side walls extend downward from edges of the upper surface of the tray. Rails extend inward from bottoms of the side walls of the tray.

A board has an outer layer and inwardly folded and glued end panels. An inwardly folded inner layer glued to an inner surface of the outer layer at one end forms a cover. An inwardly folded layer at the other end centrally glued to an inner surface of the outer layer forms a base for receiving the bottom of the tray. Creases intermediate the base and cover form a spine at the first end wall of the tray. The base has an outer layer and inner layer, and the inner layer of the base has edge portions for engaging the rails and holding the board and tray assembled. The outer layer of the base has free areas extended outward beneath side edges of the base and over the rails.

Outer lateral edge areas of the base outer layer cover the rails. The inner layer of the base has lateral edge curves for fitting within a thickness of the rails.

Ribs extend inward from the side walls of the tray and are spaced from inner surfaces of the rails for guiding the inner layer of the base below the ribs and between a rib and an inner surface of the rail.

Guide ribs extend inward from edges of the rails and have sloped sides. The guide rails face outwardly with respect to the rails. Cutouts in the outer lateral edges of the inner layer of the base are guided into registry with the rails, and inner edges of the cutouts rest against inner edges of the guide ribs within the rails.

Upward bent lateral edge areas of the inner layer of the base are inserted within the side walls of the tray and are positioned in the tray within the rails. The upward bent side walls are stepped back from an outer edge of the base and from a spine piece for fitting within the end walls of the tray.

The rails extend straight inward from bottom edges of side walls of the tray.

The upward bent side walls have vertical slits and downward folded cutout portions between the vertical slits for positioning beneath the rails, leaving upward extending portions for fitting against insides of the side walls of the tray.

The rails extend inward from bottom edges of the side walls of the tray, and guide ribs extend inward from the side walls at ends of the rails for guiding the slit and standing portions along the guide ribs.

Apertures are formed in the bent upward lateral edges of the inner layer of the base. The rails extend inward from positions below the bottom edge of the base.

These and further and other objects and features of the invention are apparent in the disclosure, which includes the above and ongoing written specification, with the claims and the drawings.

BRIEF DESCRIPTION OF THE DRAWINGS

FIG. 1 perspective view of a folded board for mechanically connecting to a tray.

FIG. 2 is a schematic representation of curving the folded board to fit in the tray.

FIG. 3 is a schematic representation of curving and fitting a fold board within a tray bottom.

FIG. 4 is a representation of machinery used for curving the folded board.

FIG. 10 is a detail of a board with inwardly folded sides.

FIG. 11 is a detail of joining the inwardly folded sides with board-retaining rails on the bottom of the tray.

FIG. 12 is a detail of the inverted tray.

FIG. 13 is a detail of a folded board with tray side graphics.

FIG. 14 is a detail of the side edge of the board.

FIG. 15 is a detail of an assembled port and tray showing the side view graphics.

FIG. 16 is a detail of bending the board to fit within the tray.

FIG. 17 is a detail of the side tabs of the board fitting between the rail assemblies.

DETAILED DESCRIPTION OF THE PREFERRED EMBODIMENTS

Figure 5:
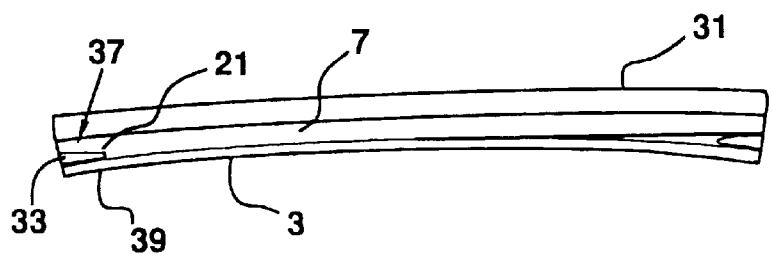
FIG. 5 is a cross-sectional representation of a tray and attached board.

Referring to FIG. 1, a board for assembly on a disk-holding tray is generally indicated by the numeral 1. Board 1 has a base layer 3 and inward folded end sections 5 and 7, which are glued to the base layer 3 after being inwardly turned and folded around fold lines 9.

Creases 11 are formed near the middle of the board 3 to form a spline when the cover panel 5 is folded over a tray. Single side printing can be provided on the inner surfaces of the cover 5 and inward folded base 7, and on the outer surface of the bottom layer 3 of the folded panel.

Grooves 13 on the inner base layer 7 receive rails on the bottom of the tray. The inner edges 15 of the grooves fit under the rails and along the inside of the extensions which hold the rails, and longitudinal ends 17 of the grooves fit along the rails to prevent relative movement of the board and tray once the board has been assembled. The fold 9 at the outer end of the bottom panel 7 is cut 19 at ends. The entire lower surface of cover panel 5 may be glued or spot glued to the inside of the lower panel 3. Only the inner portion of the tray mounting 7 is glued to the lower panel 3. That allows the outer lateral edge portions 21 of the inner panels 7 to bend at a reduced radius when the board 1 is assembled on the tray. To assemble the board 1 on a tray, the board is first curved. Hold-downs 23 extend inward on edges of the board, as shown in the assembly details in FIGS. 2, 3 and 4.

Actuators 25 reciprocate the hold-downs in and out on each cycle. Fingers 27 mounted on frame 29 move upward. The fingers 27 and hold-downs 23 curve the board 1 into a trough shape. Tray 31 is moved downward and rails 33, which extend inward from side walls 35 of the tray, fit within the recesses 13 so that the inner edges 15 of the recesses engage the inner surfaces 37 of the downward extended side walls 35 at the rails 33. The outer surfaces 39 of the board 3 underlie the rails 33. The engaging of the outer surfaces 39 on the outer surfaces of the rails 33 allows the outer portions 21 of the inner layers 7 to curved upward for fitting within the rails.

When the hold-downs 23 are moved out from contact with the board, the board snaps outward to a flat position, as shown in FIG. 3A, and the tray is assembled.

FIG. 5 shows a tray 31 assembled on a board 1, with the outer edge portions 39 of the lower layer 3 extending outward beneath the rails 33. Outer portions 21 of the inner layers 7 extend over the rails 33 and abut the inner vertical surfaces 37 of the rails.

Figure 6:
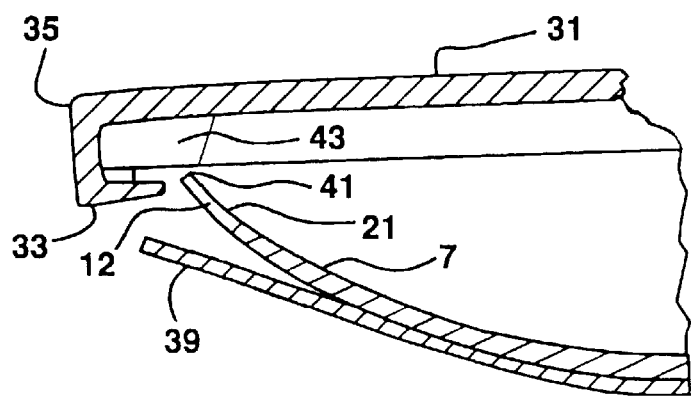
FIG. 6 is a detail of the attaching of a board to a tray.
Figure 7:
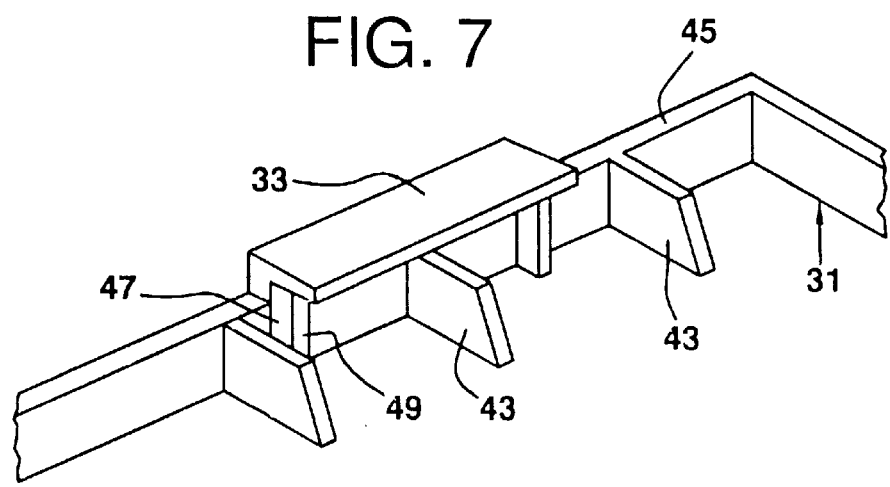
FIG. 7 a detail of a tray element for attaching to a board.

The assembly procedure is shown in the detail of FIG. 6. As the tray 31 is moved toward the board which is held in a trough shape, the outer portion 39 engages the lower surfaces 33 of the rails, and the outer edge portion of the inner layer 7 continues upward in the trough-shaped bend. Outer edges 41 of the inner layer 7 contact the two or more ribs 43, which are positioned under or next to the rail 33 to guide the tips outward so that they extend outward over the lower rim 45 of the tray 31. FIG. 7 shows the tray inverted. Sloped guide ribs 47 at edges of the rails 33 guide the side edges 17 of the recesses in the inner board 7. Inner edges 15 of the recesses rest against inner edges 49 of the guide ribs 47.

Figure 8:
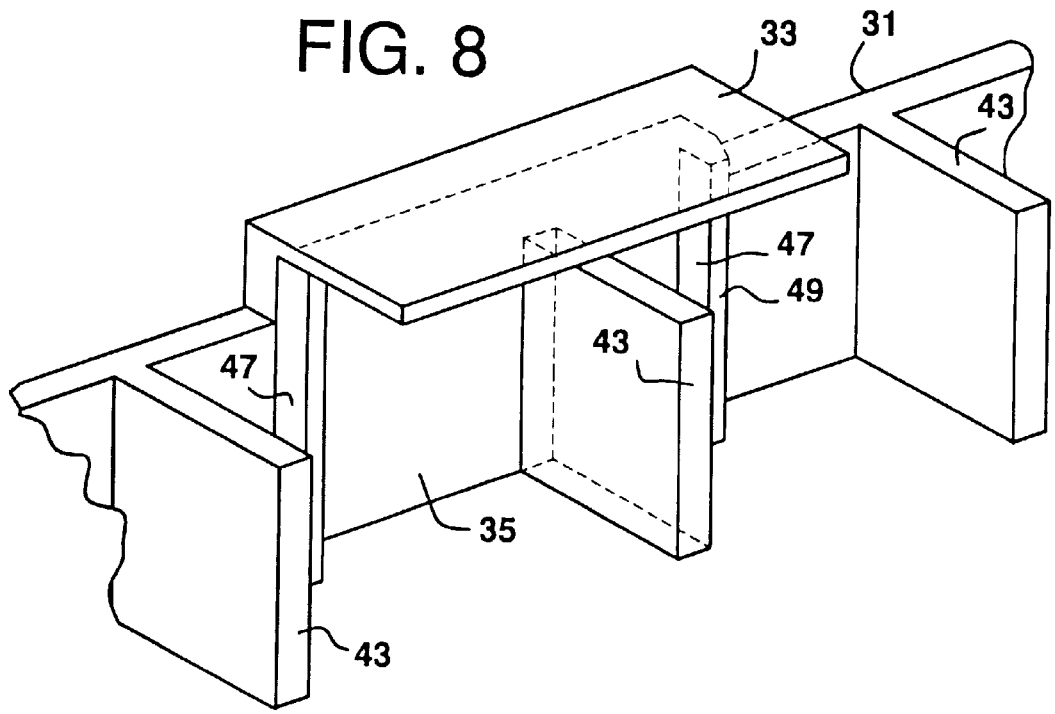
FIG. 8 is an enlarged detail of a tray attachment.
Figure 9:
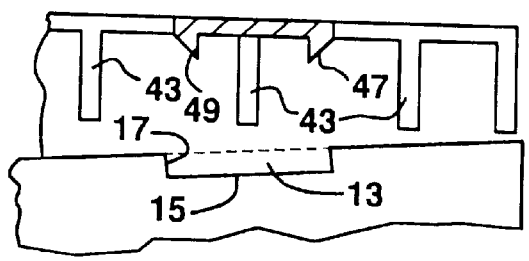
FIG. 9 is an assembly detail showing the guides at ends of the board rails.

The tray and assembly details are shown in FIGS. 7, 8 and 9. Vertical ribs 43, which extend inward from inner surfaces 35 of the side walls 33 of tray 31, support the outer portions 21 of the inner panel 7. Angle guide ribs 47 at the edges of the rails 33 guide the side edges 17 of the recesses 13 when the tray is assembled. Edges 15 of the recesses 13 fit beneath the rails 33 and against the inner edges 49 of the guides 47.

As shown in FIG. 10, the board 51 has an outer layer 3 and an inner cover layer 5 folded along edge 9 and glued to the inside surface of the outer layer. The tray base 53 is folded inward along a fold line 9, and a central portion of the tray base is glued to the inner surface of the outer layer 3. Before the folding along edge 9, cutouts 55 are formed near the outer and inner ends of the panel 53 so that the side walls 57 are stepped back from the outer edge and from the spine. The folded portions 57 then fit within the sides 35 of trays 31 and tuck beneath the rails 33. The overlapping edge portion 59 of the outer board layer 3 covers the outer surface of the rails 33 and the outer edge surface 61 of the tray, as shown inverted in the FIG. 12 detail. The tray has an inner recess 63 which receives the disk. The lower surface 65 of the inner recess rests against but is not glued to the inner surface of the upper layer 53. The inner layer 53 and the outer layer 3 are glued together only in the area 67, as shown in the detail of FIG. 11, and are not glued together in the lateral areas to allow the inner area 57 to be positioned within the side walls 35 of the tray.

An alternate embodiment is shown in FIGS. 13–17. A tray 71 has an inner surface 73 with lateral sides 75 that are slit 77 and partially folded inward 79 to lie beneath the rails 33 on trays 31, as shown in FIG. 15. Outer surfaces of the upstanding sides 75 are visible through the transparent side walls 35 of the trays 31. The outer extension 59 of the lower layer 3 extends over the rails 33 and over the lower edges 61 of the tray shown inverted in FIG. 17. The tray side walls 35 have inward extending ribs 81 with bottom surfaces 83 beneath which the inward folded portions 79 are positioned to secure the tray and the board.

As shown in FIG. 16, the hold-downs 23 and fingers 27 form a trough shape with the board. The board is glued 67 near the center while outer portions remain unglued. The inner, upper extending side walls 75 of the inner board portion 73 are curved inward to fit within the tray, while the outer extensions 59 of the lower layer 3 extend outward to engage the outer edges 61 of the tray.

Figure 18:
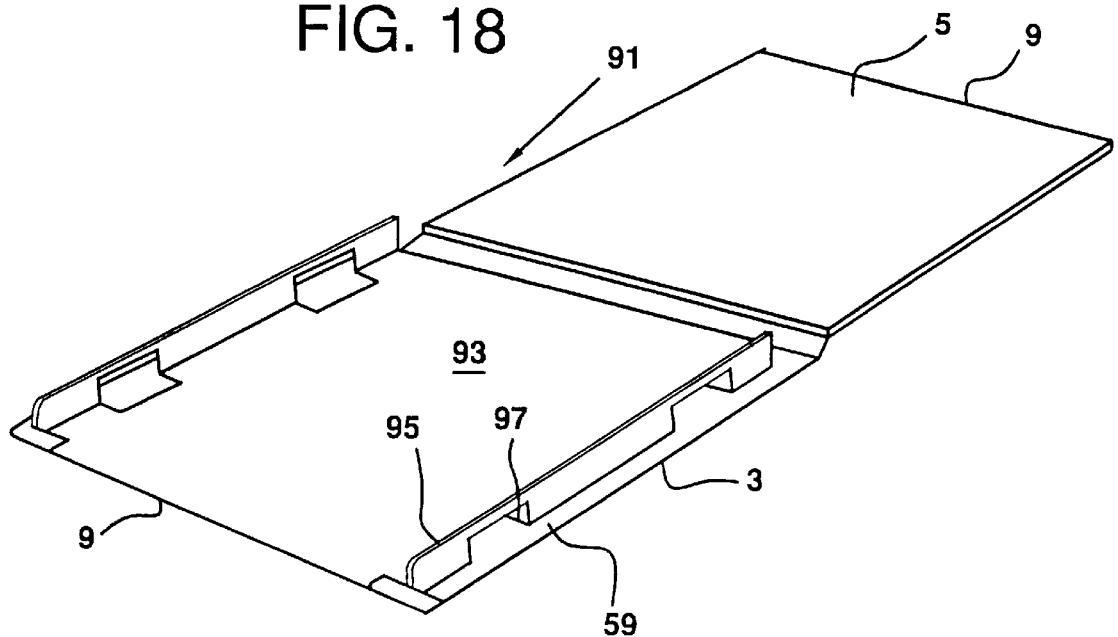
FIG. 18 is a detail of an alternate folded board.
Figure 19:
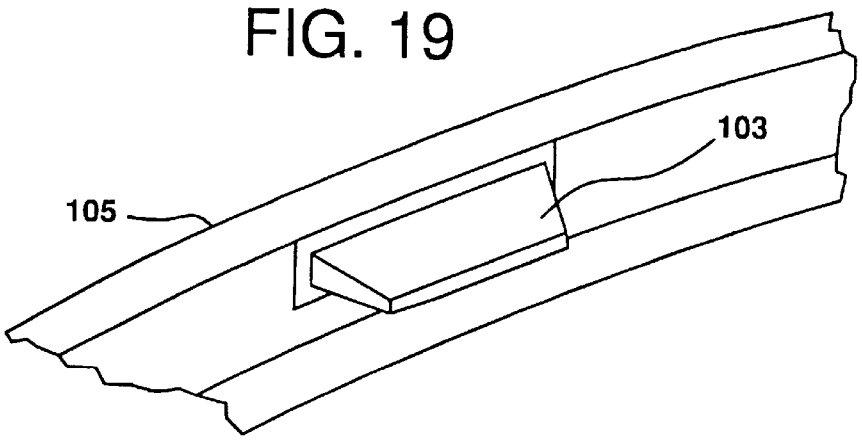
FIG. 19 is a detail of a side rail on a tray extending through a slot on the board.
Figure 20:
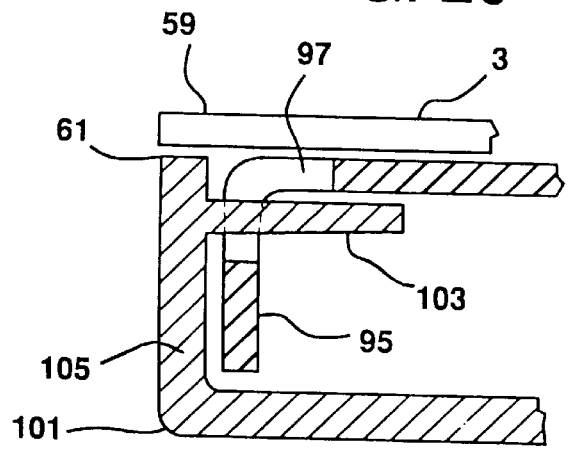
FIG. 20 is a cross-sectional detail of the side rail on the tray fitting through the slot on the board.

Another embodiment is shown in FIGS. 18, 19 and 20, in which the board 91 has a folded inner base layer 93 with side walls 95, which are bent upward from the base. Apertures 97 are formed in the upward bent side walls. Trays 101, as shown in the details of FIGS. 19 and 20, have rails 103 which extend inward from side walls 105. The boards 91 are deformed into a trough shape. The side tabs or walls 95 fit within the walls 105 as the parts are assembled. When the curvature of the board is released, the apertures 97 slide onto the rails 103 while the edges 59 of the outer layer 3 rest against the edges 61 of the trays 101, tightly and mechanically locking the board and tray.

While the invention has been described with reference to specific embodiments, modifications and variations of the invention may be constructed without departing from the scope of the invention, which is defined in the following claims.

I claim:

1. Media holding package assembly apparatus for forming a trough with a folded and creased board for fitting within side walls of a media-holding tray and mechanically locking with the media holding tray, comprising hold-downs extensibly positioned at each end of the board for extending over the board, and multiple fingers positioned beneath the board in rows along each side of the board for extending upward after the hold-downs have been extended over the board, to form a trough from the board for inserting within rigid side walls of a tray.

2. Media holding package assembly apparatus for forming a trough with a folded and creased board for fitting within side walls of a media-holding tray and mechanically locking with the media holding tray, comprising a hold-down extensibly positioned at an end of the board for extending over the board, and fingers positioned beneath the board in rows along each side of the board for extending upward after the hold-downs have been extended over the board, to form a trough from the board for inserting within rigid side walls of a tray.

3. Media holding package assembly apparatus for forming a trough with a folded and creased board for fitting within side walls of a media-holding tray and mechanically locking with the media holding tray, comprising hold-downs extensibly positioned for extending over the board, and side elevators positioned beneath the board in rows along each side of the board for extending sides of the board upward after the hold-downs have been extended over the board, to form a trough from the board for inserting within rigid side walls of a tray, the hold downs and the side elevators releasing the board for recovering a flat shape and engaging the tray.

* * * * *